Oct. 13, 1970  J. J. ABELL  3,533,900

DUPLEX, LAMINATED, VINYL PLASTIC PRINTING PLATES

Filed Dec. 20, 1966

INVENTOR.
Jerrold J. Abell
BY Robert R. Churchill
ATTORNEY 3,533,900
DUPLEX, LAMINATED, VINYL PLASTIC
PRINTING PLATES
Jerrold J. Abell, Manchester, Conn., assignor to Rogers Corporation, Rogers, Conn., a corporation of Massachusetts
Filed Dec. 20, 1966, Ser. No. 603,365
Int. Cl. B32b 7/02; B41f 29/02
U.S. Cl. 161—159                7 Claims

ABSTRACT OF THE DISCLOSURE

A duplex laminated sheet material is presented for use in forming a plastic printing plate having raised characters. The upper sheet of the laminate is the sheet on which the raised characters are to be formed, and this other sheet is a microporous homopolymer or copolymer of vinyl chloride which results in a hard surface with raised characters substantially free of imperfections. The lower or backing sheet is a plasticized homopolymer or copolymer of vinyl chloride to provide a soft backing to improve the life characteristics of the printing plate.

---

Figure 1:
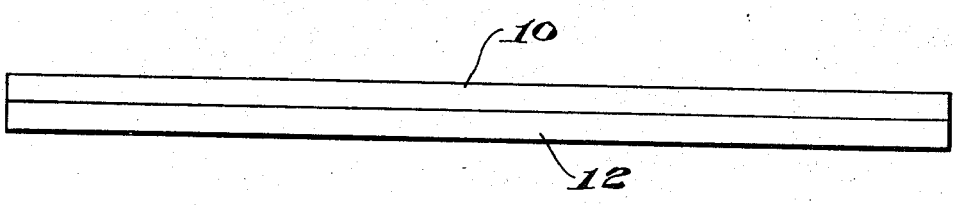

The present invention relates to a laminated plastic printing plate.

The principal object of the invention is to provide a novel and improved laminated sheet material particularly suitable for the preparation of high fidelity plastic printing plates particularly adapted for use on rotary type printing presses.

A further object of the invention is to provide a printing plate having sufficient flex life and flexibility to withstand flexing caused by irregularities between the plate and the printing press bed or cylinder and having one surface of sufficient hardness to provide a long-wearing surface with excellent definition.

Prior to the present invention plastic printing plates have been made from thermoplastic as well as from thermosetting resins. Such plates have been made from copolymers of polyvinyl chloride and polyvinyl acetate and have been found to be successful. Plastic prining plates of rigid plastic are well known in the letter press printing industry. However, one of the mapor drawbacks of having a plate which is too hard has been its relatively poor resistance to fatigue flex-cracking. On the other hand, if a sheet material which is too soft is used to produce a printing plate, the final plate will be relatively poor definition and life.

In the drawing illustrating the present invention:

FIG. 1 is an enlarged cross section of the present microporous permeable laminated sheet.

In FIG. 1, 10 represents the relatively hard surface layer of the sheet and 12 represents the relatively flexible backing layer.

The plastic laminated sheet material formed in accordance with the present invention comprises a flexible resilient layer which in the printing operation would be closest to the cylinder or printing press bed, and the relatively harder surface layer would actually be the printing surface. The preferred composition of the backing layer is a plasticized vinyl material, and the hard surface layer is preferably a medium acetate content vinyl chloride-vinyl acetate compolymer.

The mecroporous permeable backing layer of the invention can be prepared in accordance with various techniques known in the art, but it is preferred that it be made by the process described in the United States patent to Walter W. Yarrison, No. 3,067,469, issued Dec. 11, 1962. As pointed out in this application, copolymers of vinyl chloride and vinyl acetate are commercially available in particular sizes suitable for producing microporous permeable sheets, this size being preferably such that they will pass through a 30-mesh screen. When a blend of copolymers and/or fillers is to be employed, they will be blended by conventional powder blending techniques.

The following example, as set forth, is illustrative of the invention, but not intended in any manner to limit its scope.

EXAMPLE I

The following formulation for producing the flexible backing layer was formed into a microporous permeable sheet by the process described by the Yarrison Pat. No. 3,067,469.

| Component: | Parts by wt. |
|---|---|
| A vinyl chloride homopolymer or a vinyl chloride and vinyl acetate copolymer (97%–3%) | 100 |
| Di-octyl phthalate | 35–65 |
| Epoxidized tallate oil | 5 |
| Stabilizer | 1 |
| Pigment | 3 |

The microporous permeable surface layer may also be prepared by various known techniques in the art. However, it is also preferred to make it in accordance with the process described in the Yarrison Pat. No. 3,067,469, issued Dec. 11, 1962.

EXAMPLE II

The following is an example of a preferred formulation of the top layer which is illustrative, but not intended by way of limitation.

In accordance with the Yarrison patent, a microporous sheet was formed from an unplasticized copolymer of vinyl chloride and vinyl acetate (92–82%) vinyl chloride and 8–18% vinyl acetate.

In accordance with the preferred process of producing the laminated sheet material, the backing layer is first produced in accordance with the process described in the Yarrison Pat. No. 3,069,469, the components being sintered and the layer so formed being rolled into a roll. The surface layer is preferably prepared and simultaneously attached to the previously prepared backing layer in accordance with the process described in the United States patent to Berry et al., No. 3,258,513.

The microporous permeable laminated sheet may then be cut into sheets of any desired size, cold-molded into a printing plate having sharply defined characters free of imperfections by preheating it for two minutes at 300° F. with contact pressure, and molding it for three minutes in a cool press at 1000 p.s.i.

Due to the microporous permeable characteristics of each of the layers of the present laminated sheet material, there is a complete fill-out of characters and good definition provided because air which would otherwise be trapped escapes through the permeable body of the microporous sheet and because of the compressibility of the sheet, there is a minimum occurrence of "flashing."

While it is highly preferred that both the component layers of the laminated sheet be microporous prior to the molding, it will be understood that the backing layer may be a non porous plastic material.

Thus a printing plate is produced which has a surface layer of sufficient hardness to provide characters free of imperfections and having a backing layer of sufficient softness to give plate flexibility so that its life is substantially increased.

It will also be understood that the stiffness of the laminated sheet may be varied by either increasing the overall thickness of the laminated sheet, by increasing the thickness of the harder surface layer of the laminate, by modifying the formulation of the backing layer.

Having thus described the invention, what is claimed is:

1. A laminated printing plate comprising a relatively hard plastic surface sheet having raised characters thereon, and surface sheet being essentially free of plasticizer and of sufficient hardness that the characters are free of imperfections, said surface sheet being microporous prior to formation of raised characters thereon, and a relatively soft resilient plastic backing sheet bonded to said surface sheet, said backing sheet including a plasticizer and being of sufficient softness to give the plate flexibility and resilience whereby the life of the printing plate is increased, the plastic material in each of said backing layer and said surface layer comprising a polymer selected from the group consisting of vinyl chloride homopolymers and vinyl chloride copolymers.

2. A laminated printing plate as defined in claim 1 wherein the surface sheet is composed of a copolymer of vinyl chloride and vinyl acetate, said copolymer being free of a plasticizer, and said backing sheet is composed of a copolymer of vinyl chloride and vinyl acetate including a plasticizer.

3. A laminated printing plate as in claim 1 wherein said surface sheet is composed of a copolymer of vinyl chloride and vinyl acetate, and said backing sheet is composed of a plasticized polymer selected from the group consisting of polyvinyl chloride, polyvinyl acetate and copolymers of vinyl chloride and vinyl acetate.

4. A duplex laminated sheet material for use in molding plastic printing plates having raised characters, the laminated sheet material comprising:

a flexible backing layer of resilient flexible plastic material including a plasticizer; and a surface layer of a plastic material relatively hard with respect to said backing layer, said surface layer being microporous and essentially free of plasticizer; the plastic material in each of said backing layer and said surface layer comprising a polymer selected from the group consisting of vinyl chloride homopolymers and vinyl chloride copolymers;

said layers being bonded together to provide a laminated sheet for formation into a letter press printing plate wherein said surface layer will have sharply defined raised characters thereon and said backing layer will be of sufficient flexibility and resilience to enhance the life of the printing plate.

5. A duplex laminated sheet material as in claim 4 wherein:

said backing layer is microporous; and wherein both said backing layer and said surface layer are air permeable.

6. A duplex laminated sheet material as defined in claim 4 wherein said surface sheet is composed of at least one copolymer of vinyl chloride and vinyl acetate, said copolymer being free of plasticizer.

7. A laminated sheet material as defined in claim 6 wherein said copolymer contains 92–82% by weight of vinyl chloride and 8–18% by weight of vinyl acetate.

References Cited

UNITED STATES PATENTS

| | | | |
|---|---|---|---|
| 2,741,297 | 4/1956 | Vamvaketis | 161—166 XR |
| 2,748,042 | 5/1956 | Borgese | 161—166 XR |
| 2,792,321 | 5/1957 | Fredericks | 161—401 XR |
| 3,075,863 | 1/1963 | Frey | 161—242 XR |
| 3,091,597 | 5/1963 | Henriques | 260—31.4 |
| 3,238,086 | 5/1966 | Tompkins | 161—401 XR |

JOHN T. GOOLKASIAN, Primary Examiner

G. W. MOXON, Assistant Examiner

U.S. Cl. X.R.

161—160, 166, 400, 401